United States Patent [19]
Nakagawa et al.

[11] Patent Number: 5,499,791
[45] Date of Patent: Mar. 19, 1996

[54] MACHINE HAVING VIBRATION SOURCE

[75] Inventors: Kenji Nakagawa; Koichi Yoshizaki; Tadashi Nukaga; Yoshikazu Banba; Shigetaka Hattori; Kentaro Mochizuki, all of Shiga, Japan

[73] Assignee: Sanyo Electric Co., Ltd., Moriguchi, Japan

[21] Appl. No.: 112,853

[22] Filed: Aug. 26, 1993

[30] Foreign Application Priority Data

Aug. 31, 1992 [JP] Japan ................................. 4-230826

[51] Int. Cl.⁶ .................................................. F16M 13/00
[52] U.S. Cl. .......................... 248/638; 248/616; 248/634
[58] Field of Search ..................................... 248/649, 650, 248/615, 616, 634, 632, 633, 638, 188.9, 346

[56] References Cited

U.S. PATENT DOCUMENTS

| | | | |
|---|---|---|---|
| 1,005,963 | 10/1911 | Groat et al. | 248/638 X |
| 2,739,774 | 3/1956 | Crede | 248/616 |
| 3,442,475 | 5/1969 | Rivin | 248/616 |
| 3,592,423 | 7/1971 | Mui | 248/616 |
| 3,868,079 | 2/1975 | Johnson . | |
| 4,223,762 | 9/1980 | Gertal | 248/638 X |
| 4,575,034 | 3/1986 | Tobey | 248/615 X |
| 5,310,156 | 5/1994 | Matsumura et al. | 248/638 X |

FOREIGN PATENT DOCUMENTS

| | | |
|---|---|---|
| 1268867 | 9/1960 | France . |
| 1218362 | 6/1966 | Germany . |
| 2221606 | 11/1973 | Germany . |
| 9005678 | 9/1991 | Germany . |
| 1010350 | 4/1983 | U.S.S.R. ............................ 248/615 |

*Primary Examiner*—Karen J. Chotkowski
*Attorney, Agent, or Firm*—Darby & Darby

[57] ABSTRACT

A machine with vibration source includes a frame for carrying a vibration source such as a motor. A housing is attached to a bottom of the frame, in which a sphere made of a rigid material is housed rotation free in a manner that a portion of the sphere is projected from an opening at the bottom of the housing. The surface of a plate made of a rigid material contacts the portion of the sphere projecting from the housing and the plate is surrounded by a member of an elastic material. The elastic member has an upwardly extending portion which surrounds the housing, and therefore, the elastic member controls the relative position between the sphere and the plate, and resultingly, rolling of the machine can be suppressed. In addition, since the sphere can be rotated on the plate, horizontal vibration of the machine is absorbed to be suppressed. Furthermore, since the sphere is supported by the plate and the plate is supported by a floor via the elastic member, vertical vibration of the machine is also suppressed.

14 Claims, 9 Drawing Sheets

MACHINE HAVING VIBRATION SOURCE

BACKGROUND OF THE INVENTION

1. Field of the Invention

The present invention generally relates to a machine with vibration source. More specifically, the present invention relates to a washing machine, an electric generator, or the like which includes a vibration source such as a motor.

2. Description of the Prior Art

As shown in FIG. 10, in a machine with vibration source 1 such as a washing machine, an electric generator etc., a leg 3 made of an elastic material such as butyl rubber is attached to a bottom surface of a frame carrying the vibration source such as a motor.

In such a prior art, since the leg 3 is formed of an elastic material such as butyl rubber, expansion and contraction of the leg 3 in an up-down direction, i.e. a vertical direction is large; however, the same almost never expand and contract in a lateral direction, i.e. a horizontal direction, and therefore, there was a problem that it is impossible to sufficiently suppress horizontal vibration.

SUMMARY OF THE INVENTION

Therefore, a principal object of the present invention is to provide a machine with vibration source, in which vibration can be suppressed sufficiently.

A machine according to the present invention includes: a vibration source; a frame for carrying the vibration source; and at least one leg for supporting the frame. The leg includes a sphere made of a rigid material and attached to a bottom of the frame rotation free. A plate made of a rigid material is disposed below the sphere to be brought into contact with the sphere; and a control member made of an elastic material controls a relative position between the sphere and the plate.

Expansion and contraction of the leg in up-down direction, i.e. vertical direction, is restricted by the sphere, whereby a vibration of the machine in the up-down direction, i.e. the vertical direction or longitudinal direction, can be suppressed. Furthermore, since a movement of the machine in a lateral or horizontal direction is secured since the sphere can be move with rotation on the plate, the vibration of the horizontal or lateral direction, that is transferred to a floor can be suppressed. In addition, if the amplitude of the vibration becomes large, the movement of the sphere is restricted by the control member, and therefore, rolling of the machine is also suppressed. Thus, in accordance with the present invention, it is possible to sufficiently suppress both the vertical vibration and the horizontal vibration of the machine.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
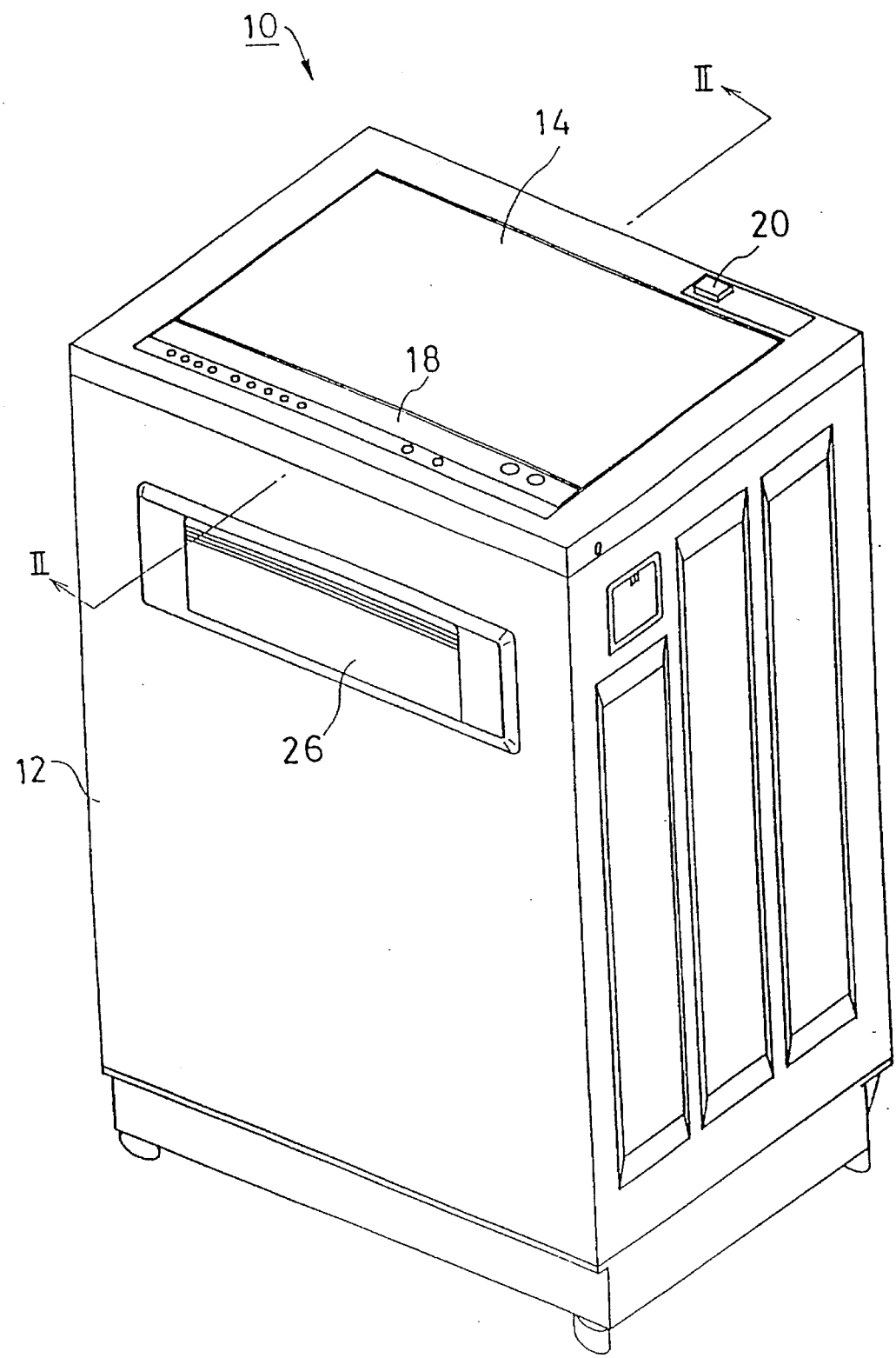
FIG. 1 is a perspective view showing one embodiment according to the present invention.
Figure 2:
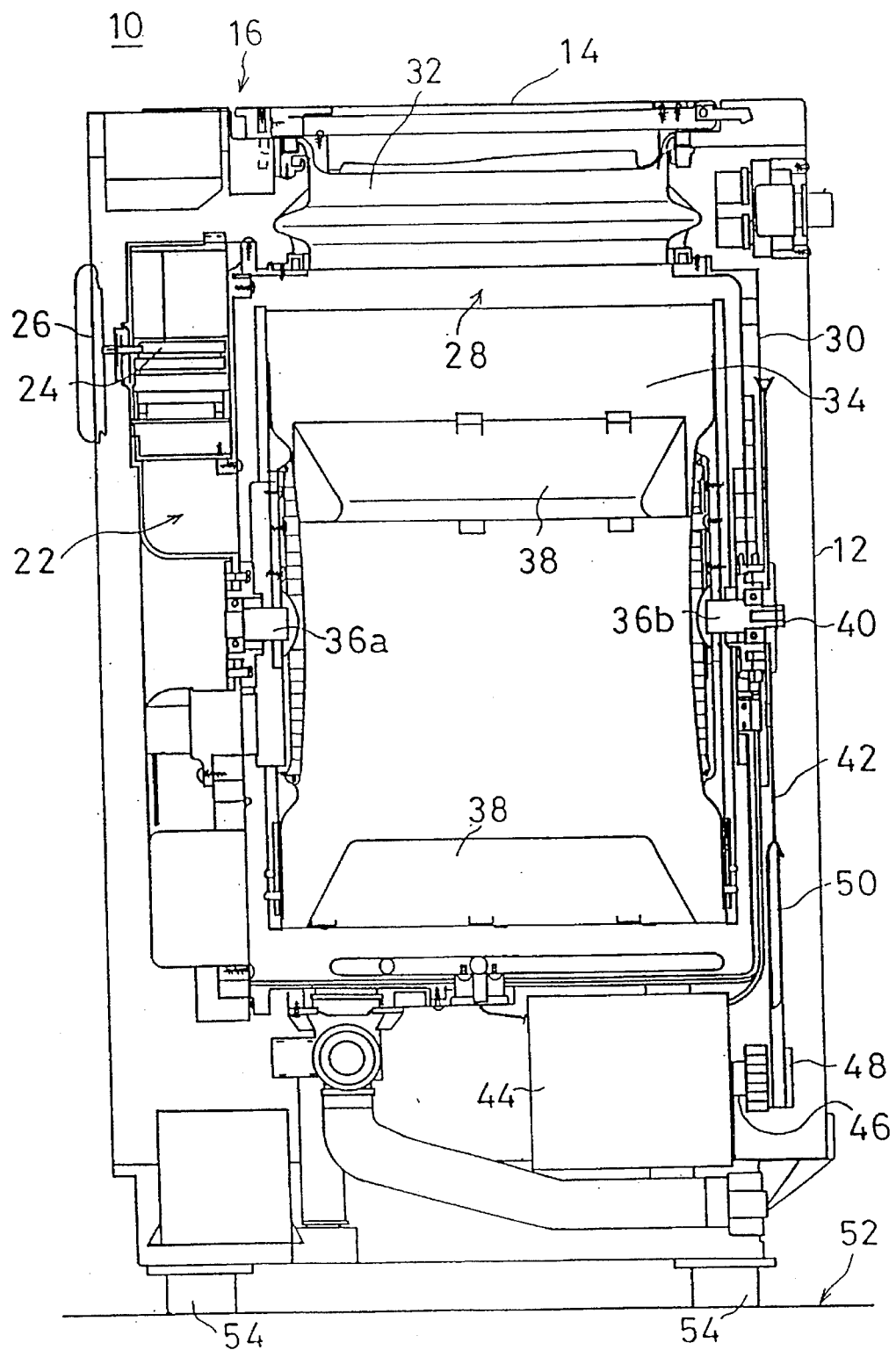
FIG. 2 is a cross-sectional view at a line II—II in FIG. 1 embodiment.

In an embodiment shown in FIGS. 1 and 2, although the present invention is illustratively applied to a drum-type washing machine, it can be widely applied to other types of machines having a vibration source, for example, an electric generator, a compressor, etc., and other than such a drum-type washing machine.

A drum-type washing machine 10 of the embodiment shown in FIGS. 1 and 2 includes an approximately box-like frame 12, and an opening 16 which is closed and opened by an upper cover 14 is formed in a center of an upper surface of the frame 12. An operation panel 18 having an arrangement of selection keys for selecting a washing program, a power switch 20, etc. is disposed on a peripheral edge portion of the upper surface of the frame 12. Furthermore, the frame 12 is provided inside with a warm air path 22 within which a movable filter 24 is attached. A port 26 for taking out a removable filter 24, and etc. are formed on a side surface of the frame 12.

As seen from FIG. 2, inside the frame 12, a horizontal cylinder-like outer tub 30 having an opening 28 in an upper portion thereof is supported by a support member (not shown). Then, the opening 28 of the outer tub 30 is connected to the opening 16 of the frame 12 by a connecting member 32 made of rubber or the like.

Furthermore, within the outer tub 30, a horizontal cylinder-like drum 34 made of stainless steel or the like is supported in a rotatable manner by rotation shafts 36a and 36b. An opening (not shown) for putting a wash in or taking the wash out the drum 34 are formed on a periphery of the drum 34, and on an inner surface of the drum 34, there are formed baffles 38 for lifting-up and dropping-down the wash in a washing process and a drying process.

In a state where the drum 34 is supported within the outer tub 30 by the rotation shafts 36a and 36b, one rotation shaft 36b of the drum 34 projects from the side surface of the outer tub 30 to an outside of the outer tub 30, and a driving pulley 42 is fixed onto a projected portion 40 of the rotation shaft 36b. In addition, a motor 44 is disposed below the outer tub 30, and a small pulley 48 is fixed to an output shaft 46 of the motor 44. The driving pulley 42 and the small pulley 48 are coupled to each other by a belt 50, whereby a driving force from the motor 44 is transmitted to the drum 34.

To prevent a vibration that occurs in the drum 34, the motor 44, etc. from being transmitted to a floor 52, legs 54 each having a vibration suppressing function are attached to the bottom surface of the frame 12.

Figure 3:
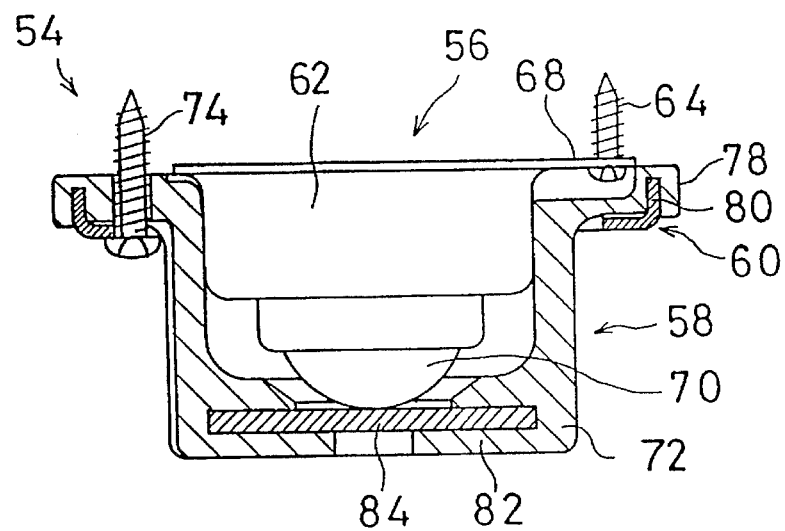
FIG. 3 is an illustrative view showing a leg employed in the FIG. 1 embodiment.
Figure 4:
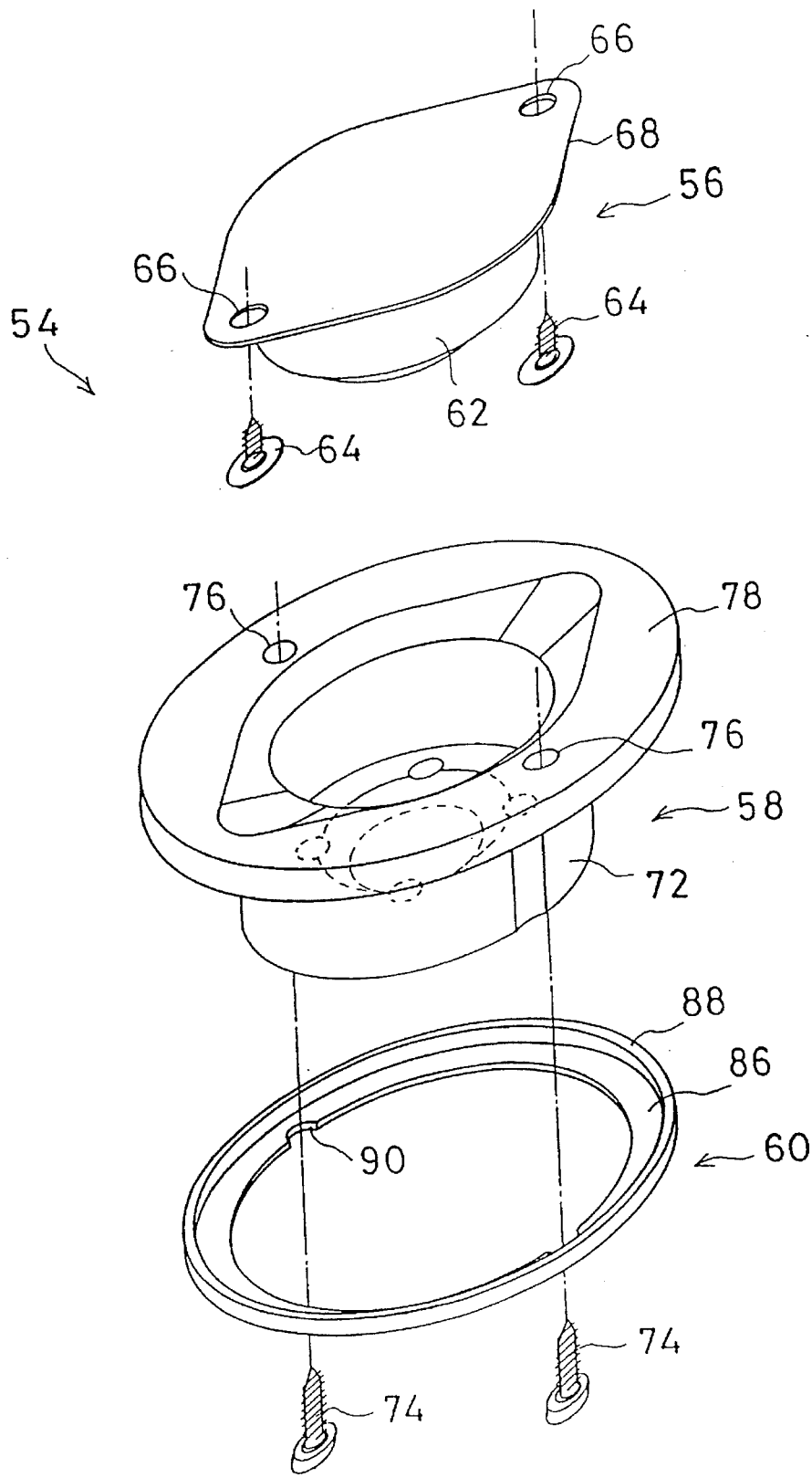
FIG. 4 is a fragmental perspective view of the leg shown in FIG. 3.

As shown in detail in FIGS. 3 and 4, the leg 54 includes a caster portion 56, a control member 58 and an attaching member 60. The caster portion 56 includes a cylinder-like housing or support 62, and a flange 68 having throughholes 66 for inserting screws 64 is formed on an upper end portion of the support 62. A sphere 70 made of a rigid material such as iron and etc. is supported rotation free by the support 62.

The control member 58 includes a body 72 made of an elastic material such as butyl rubber, etc., the body 72 having an inner surface which is conformed to an outer surface of the support 62. A flange 78 having throughholes 76 for inserting screws 74 is formed on the periphery of an upper end portion of the body 72, and a circumferential groove 80 is formed on a lower surface of the flange 78. Furthermore, a sandwiching portion 82 is formed on an inner periphery of the lower end portion of the body 72, and a plate 84 made of a rigid material such as iron and etc. is sandwiched by the sandwiching portion 82. The body 72 and the plate 84 are formed in a one-piece fashion by means of an insertion molding, etc., for example. The attaching member 60 includes a ring-like pressing portion 86, engaging portion 88 which is formed upward from an outer periphery edge of the pressing portion 86 and engaged to the groove 80 of the control member 58. Semicircular notches 90 for passing through the screws 74 are formed on the pressing portion 86.

In attaching the leg 54, at first, the caster portion 56 is attached to the bottom surface of the frame 12 by the screws 64 inserted into the throughholes 66, and the control member 58 is mounted so as to cover the caster portion 56, and the engaging portion 88 of the attaching member 60 is fitted to the groove 80 of the control member 58. Then, the control member 58 is attached to the bottom surface of the frame 12 by the screws 74 through the notches 90 and the throughholes 76. Thus, the legs 54 are sequentially attached to four corners on the bottom surface of the frame 12.

In operation, when a program including a washing process, a dehydrating process and a drying process is executed by a program selection key (not shown) of the operation panel 18 (FIG. 1), in the washing process, the drum 34 is repeatedly reversed at approximately 50 r.p.m. by the motor 44, and the wash within the drum 34 is lifted-up and dropped-down by the baffles 36, whereby a so-called tap washing is performed. In the dehydrating process, the drum 34 is rotated in one direction at approximately 800 r.p.m. by the motor 44, so that the wash in the drum 34 is dehydrated by a centrifugal force. Then, in the drying process, the drum 34 is rotated at approximately 55 r.p.m. by the motor 44 while the warm air is blown-out from the warm air path 22 to the inside of the drum 34.

Since the motor 44 and the drum 34 are rotated, the frame 12 vibrates in an up-down direction, i.e. vertical direction, and a front-rear and left-right direction, i.e. horizontal direction; however, in this embodiment shown, such vibration can be effectively suppressed. More specifically, since it is possible to suppress the expansion and contraction of the leg 54 in the vertical direction by the sphere 70 and etc., therefore, the vertical vibration of the frame 12 can be effectively suppressed. Furthermore, since it is possible to secure the movement of the frame 12 in the horizontal direction because the sphere 70 can be moved with rotation on the plate 84, it is possible to absorb the horizontal vibration that is transmitted to the floor 52 (FIG. 2). Furthermore, the relative position between the sphere 70 and the plate 84 can be controlled or restricted by the control member 58. Since the larger the vibration (amplitude) in the horizontal direction, the larger force for controlling the movement of the caster portion 56 by the control member 58, it is possible to suppress a rolling of the frame 12.

The inventors demonstrated the practicality or utility of this embodiment shown through the following test.

First Test

Figure 10:
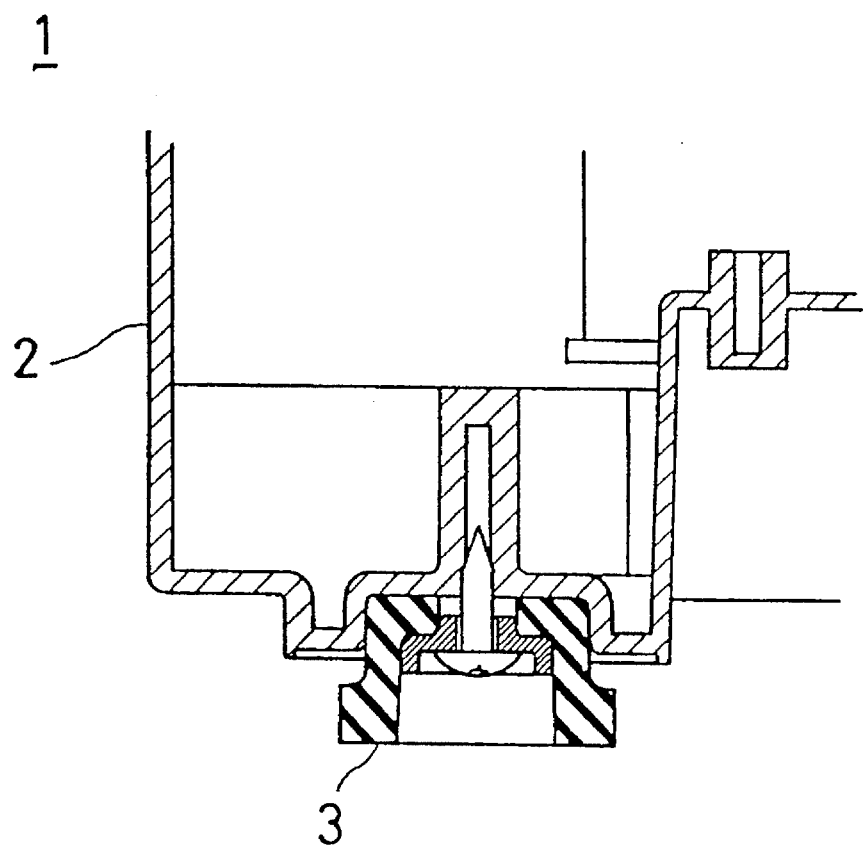
FIG. 10 is an illustrative view showing the prior art.

An amplitude measuring device is attached to a center of an upper portion of a front surface of the frame 12, and a bath towel is put in the drum 34, and then, the dehydration operation is performed. In addition, the front surface of the frame 12 is a surface on which the filter taking-out port 26 is formed. Thereafter, the amplitude of the vibration in the front-rear direction at a time that the vibration of the frame 12 becomes stable is measured by the amplitude measuring device, and the amplitude is recorded with 0.1 mm pitch. Such the measurement is repeated 50 times, and thereafter, the legs 54 are replaced with the legs 3 of the prior art (FIG. 10), and then, similar measurement is repeated 50 times.

Figure 5:
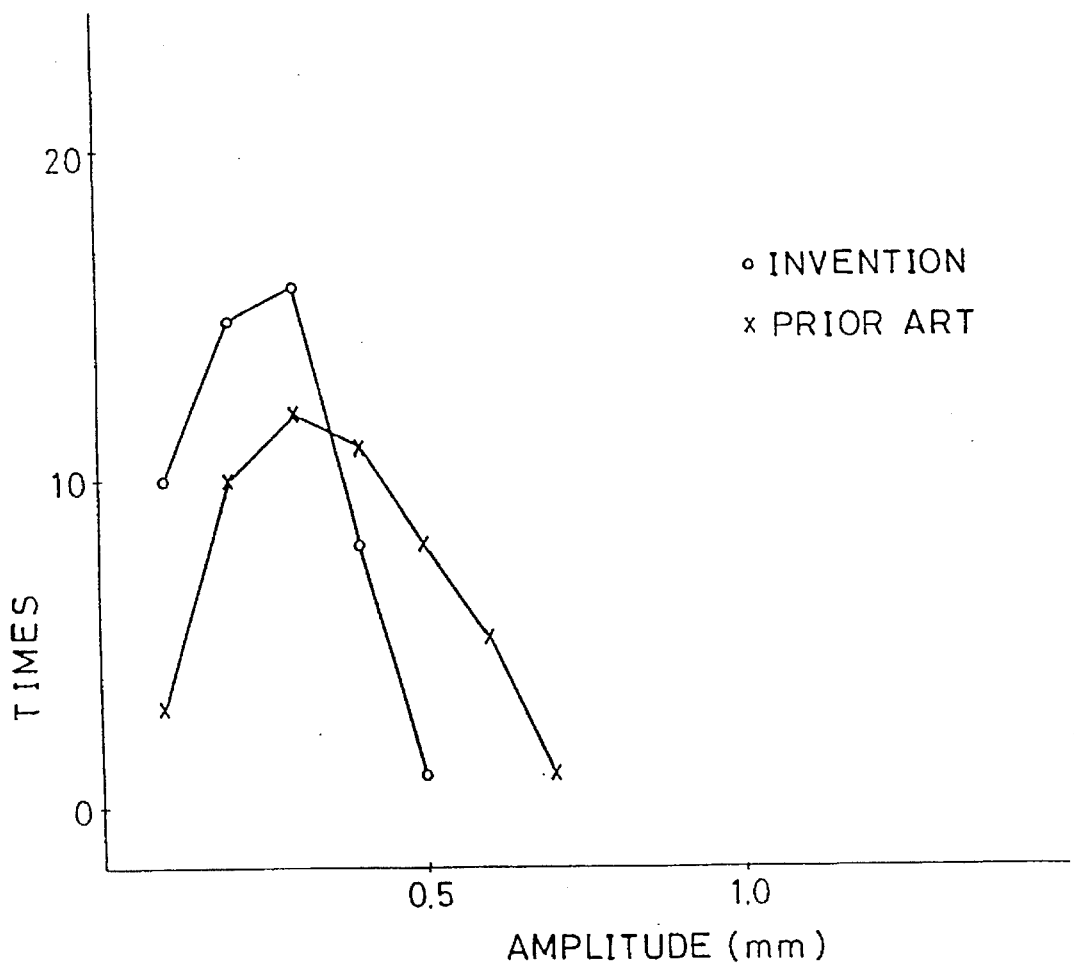
FIG. 5 is a graph showing vibration characteristics in a front-rear direction in FIG. 1 embodiment and the prior art.

FIG. 5 is a graph showing a result of the first test, wherein the abscissa indicates the amplitude of the vibration in the front-rear direction and the ordinate indicates the number of measurement times.

Second Test

The amplitude measuring device is attached to the center of the upper portion of a left-side surface of the frame 12, and a bath towel is put in the drum 34, and an amplitude of the vibration in the left-right direction of the frame 12 is measured in the same way as that of the first test.

Figure 6:
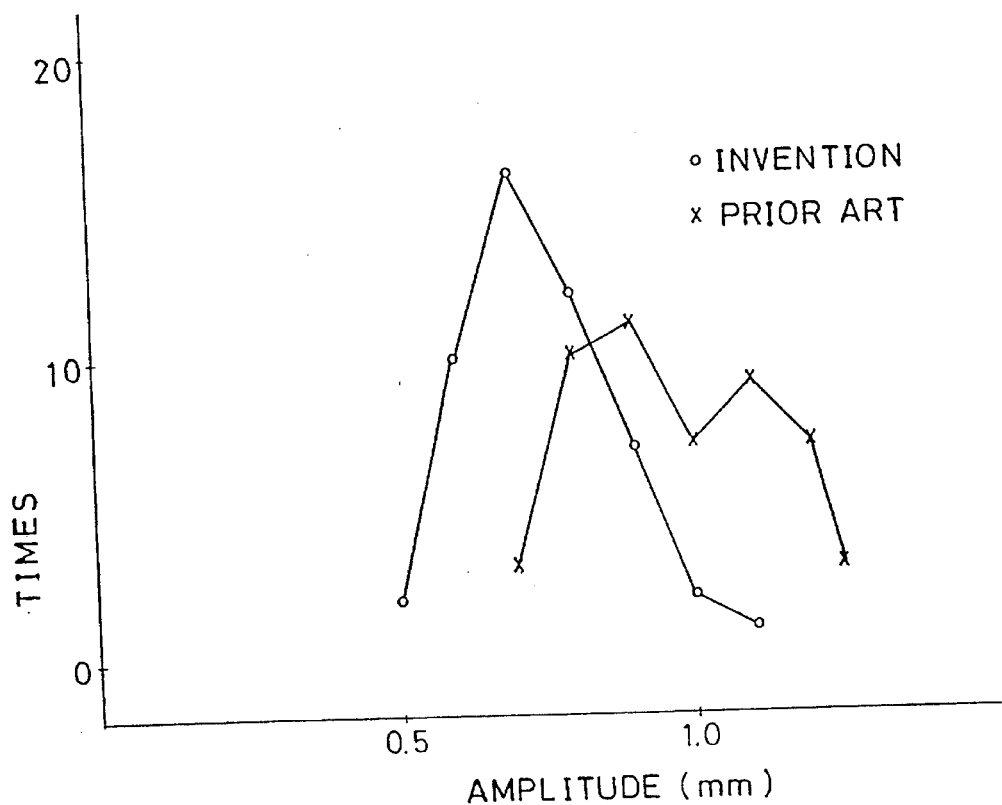
FIG. 6 is a graph showing the vibration characteristics of the left-right direction in FIG. 1 embodiment and the prior art.

FIG. 6 is a graph showing a result of the second test, wherein the ordinate indicates the amplitude of the vibration in the left-right direction and the ordinate indicates the number of measurement times.

Third Test

The amplitude measuring device is attached to a center of this side of the upper surface of the frame 12, and a bath towel is put in the drum 34, and then, an amplitude of the vibration in the up-down direction of the frame 12 is measured through the same way as that of the first test or the second test.

Figure 7:
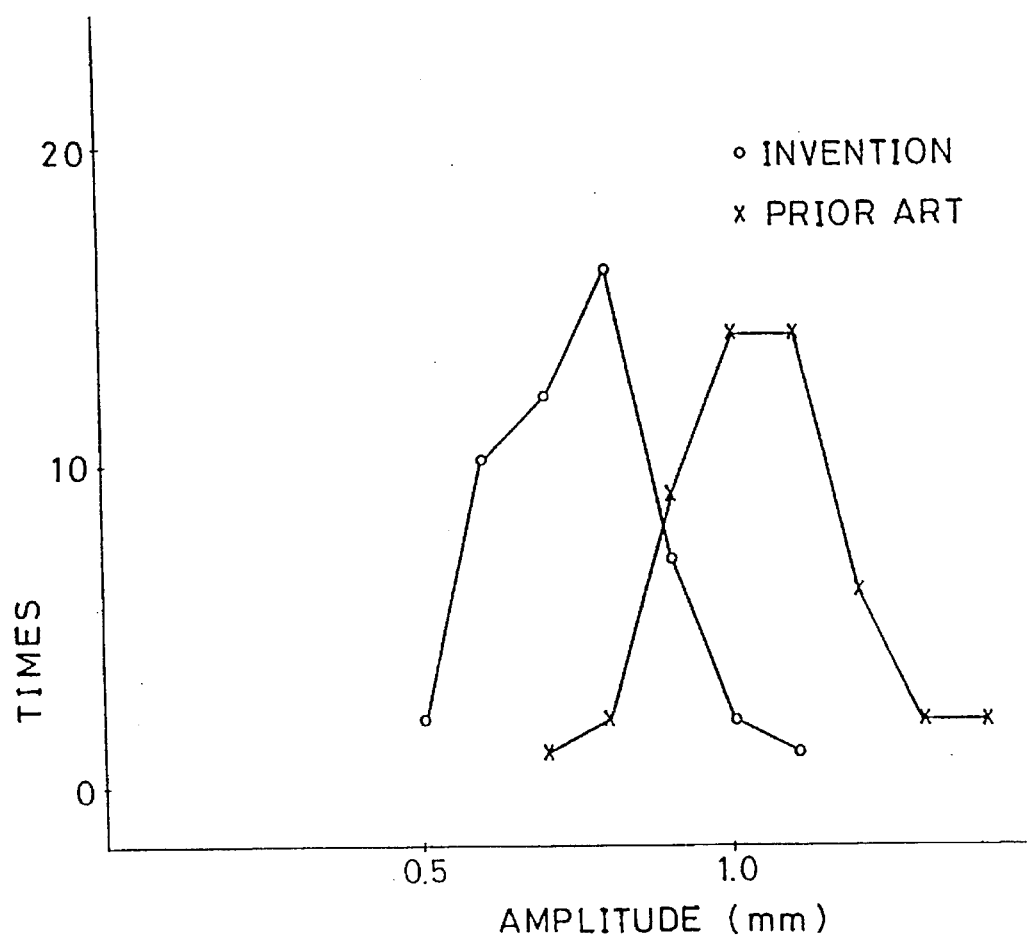
FIG. 7 is a graph showing vibration characteristics in an up-down direction of the FIG. 1 embodiment and the prior art.

FIG. 7 is a graph showing a result of the third test, wherein the abscissa indicates the amplitude of the vibration of the up-down direction and the ordinate indicates the number of measurement times.

According to the above described tests, it has been confirmed that the drum-type washing machine 10 of this embodiment shown has a sufficient vibration suppressing effect.

Figure 8:
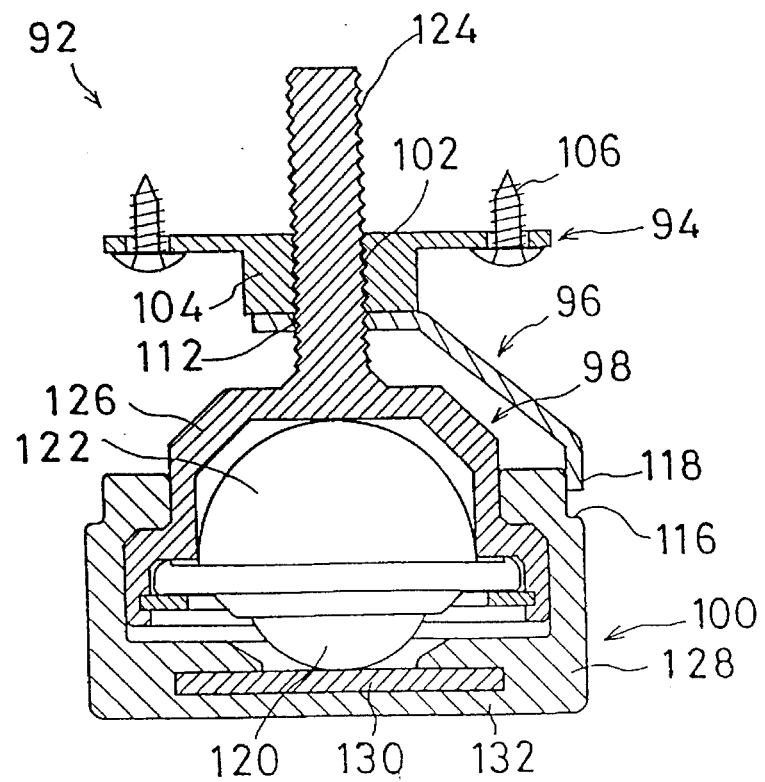
FIG. 8 is an illustrative view showing a leg employed in another embodiment according to the present invention.
Figure 9:
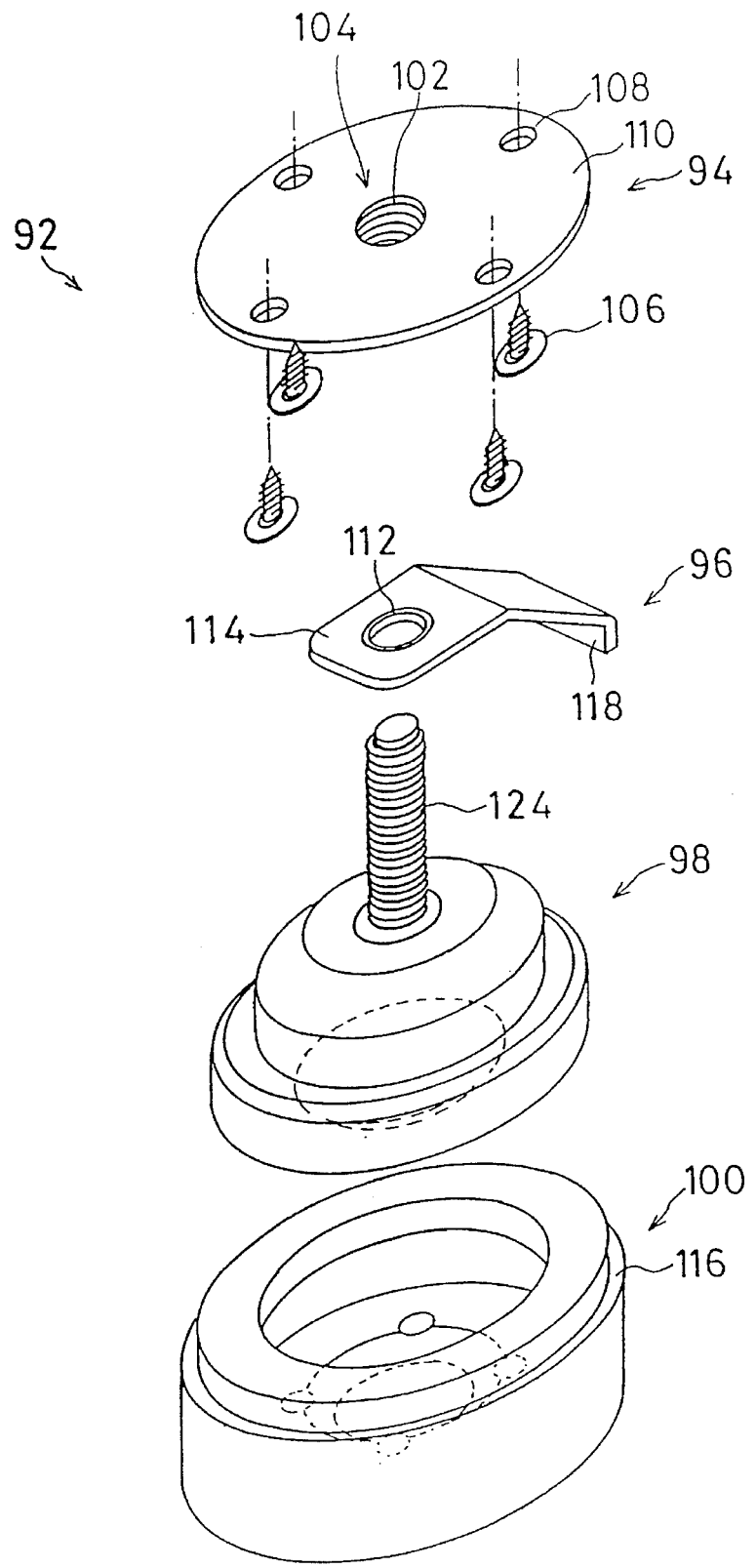
FIG. 9 is a fragmental perspective view of the leg shown in FIG. 8.

Referring to FIGS. 8 and 9, a drum-type washing machine 10 of another embodiment is shown. Instead of the legs 54 of the above described embodiment, legs 92 each having a height adjusting function are utilized. The leg 92 includes an attaching plate 94, a stopper 96, a caster portion 98 and a control member 100. The attaching plate 94 includes a threaded portion 104 having an inner surface with a threaded nut 102, and a flange 110 having throughholes 108 for inserting screws 106 are formed on an outer periphery of an upper end portion of the threaded portion 104. The stopper 96 includes a threaded portion 114 having a threaded inner surface 112, and a contact portion 118 which is extended and inclined from the threaded portion 114 to a lower portion and brought into contact with a contact surface 116 of the control member 100. The caster portion 98 includes a sphere 120 made of a rigid material such as iron and etc., a housing or first support 112 for supporting the sphere 120 in a rotation free manner, and a second support 126 which supports the first support 122 and has an upper surface with a screw 124. The control member 100 includes a body 128 made of an elastic material such as butyl rubber etc. and having an inner surface which is conformed to an outer surface of the second support 126. The above described contact surface 116 is formed on an outer periphery of an upper end portion of the body 128, and a sandwich portion 132 for sandwiching a plate 130 made of a rigid material such as iron etc. is formed on an inner periphery of a lower end portion of the body 128.

In attaching the leg 92, the attaching plate 94 is attached to the bottom surface of the frame by the screws 106 through the throughholes 108. On the other hand, the caster portion 98 and the control member 100 are fitted to each other, and the male screw 124 of the caster portion 98 is screwed into the thread of the stopper 96. Then, the screw 124 of the caster portion 98 is screwed into the nut 102 of the attaching plate 94 by a necessary depth. When the screw 124 is screwed for the depth, the contact portion 118 of the stopper 96 is brought into contact with the contact portion 116 of the control member 100, whereby the screw 124 is inhibited from being further screwed.

When such legs 92 are utilized, it is possible to suppress the expansion and construction of the leg 92 in an up-down direction by the sphere 120 etc., and therefore, the vibration in the up-down direction, i.e. the vertical direction can be effectively suppressed. Furthermore, the horizontal vibration that is transmitted to the floor can be absorbed because the sphere 120 can move with rotation on the plate 130, and the rolling of the frame can be also suppressed by the control member 100. Furthermore, the screwed depth of the screw 124 into the nut 102 can be adjusted, and therefore, it is possible to suitably adjust the height of the leg 92.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The combination comprising:
    a machine with a vibration source,
    said machine having a frame carrying said vibration source; and
    a plurality of mounts for supporting said frame, each of said mounts including
        a sphere of rigid material,
        a housing for coupling said sphere to the bottom of said frame with free rotation of said sphere, said housing having an opening and said sphere being housed rotation free within said housing with a portion of said sphere projecting from said opening,
        a plate of rigid material disposed below said sphere, said projecting portion of the sphere contacting said plate, said sphere in response to a horizontal motion component of said frame moving on said plate in a horizontal direction while in contact with said plate, and
        a control member of an elastic material for controlling movement of said sphere by a predetermined amount relative to said plate.

2. A machine according to claim 1, wherein said control member includes a cylindrical elastic member having a bottom portion and a side wall, said plate being attached to the bottom portion of said elastic member and the side wall of said elastic member surrounding said housing to control the relative position between said sphere and said plate.

3. A machine according to claim 2, wherein said elastic member further includes a portion for surrounding the projecting portion of said sphere with a predetermined gap therebetween.

4. A machine according to claim 1, further comprising an attaching plate fixed to the bottom of said frame, and means for connecting said housing to said attaching plate for changing the position of said housing in an up-down direction relative to said frame.

5. A machine according to claim 4, wherein said attaching plate includes one of a threaded nut and screw, and said housing includes the other of said threaded nut and said screw on an upper surface of said housing, said screw to be screwed into said nut.

6. A machine according to claim 2 wherein the bottom portion of said elastic member is adapted to contact the floor which supports the machine.

7. A mount for supporting a frame of a machine having a vibration source, comprising:
    a sphere of a rigid material;
    a housing attached to the bottom of said frame and having an opening in a bottom portion thereof, said sphere being housed freely rotatable within said housing with a portion projecting from said opening;
    a plate of rigid material disposed below said sphere in contact with said sphere, said projecting portion of the sphere contacting said plate, said sphere moving in a horizontal direction in contact on said plate in response to a horizontal vibration component of said machine; and
    a control member of elastic material controlling movement of said sphere relative to said plate.

8. A mount according to claim 7, wherein said control member includes a cylindrical elastic member having a bottom portion and a side wall, said plate being attached to the bottom portion of said elastic member, the side wall of said elastic member surrounding said housing to control the relative position between said sphere and said plate.

9. A leg according to claim 8, wherein said elastic member further includes a portion for surrounding the projecting portion of said sphere with a predetermined gap therebetween.

10. A mount according to claim 7, further comprising an attaching plate to be fixed to the bottom of said frame, means for attaching said housing to said attaching plate for changing the position of said housing relative to said frame in an up-down direction.

11. A mount according to claim 10, wherein said attaching plate includes one of a nut and a screw, and said housing includes the other of said nut and said screw on an upper surface of said housing said screw to be screwed into said nut.

12. A mount according to claim 8 wherein the bottom portion of said elastic member is adapted to rest on a support surface.

13. The combination comprising:
    a machine with a vibration source,
    said machine having a frame carrying said vibration source; and
    a plurality of mounts for supporting said frame, each of said mounts including
        a sphere of rigid material,
        means for coupling said sphere to the bottom of said frame with free rotation of said sphere,
        a plate of rigid material disposed below said sphere, said sphere, in response to a horizontal motion component of said frame, moving on said plate in a horizontal direction while in contact with said plate, and a control member of an elastic material for controlling movement of said sphere by a predetermined amount relative to said plate, said control member including a cylindrical elastic member having a bottom lip portion and a side wall, said plate being within the cylindrical elastic member side wall and attached to the upper part of the bottom lip portion of said elastic member and the side wall of said elastic member surrounding said coupling means to control the relative position between said sphere and said plate.

14. A mount for supporting a frame of a machine having a vibration source, comprising:

a sphere of a rigid material;

a housing attached to the bottom of said frame, said housing mounting said sphere with free rotation of said sphere;

a plate of rigid material disposed below said sphere in contact with said sphere, said sphere moving in a horizontal direction in contact on said plate in response to a horizontal vibration component of said machine; and a control member of elastic material controlling movement of said sphere relative to said plate, and including a cylindrical elastic member having a bottom lip portion and a side wall, said plate being within the cylindrical elastic member side wall and attached to the upper part of the bottom lip portion of said elastic member, the side wall of said elastic member surrounding said housing to control the relative position between said sphere and said plate.

* * * * *